United States Patent
Pandey et al.

(10) Patent No.: US 7,938,403 B1
(45) Date of Patent: May 10, 2011

(54) BRUSH SEALS

(75) Inventors: Vishwas K. Pandey, Karnataka (IN); Bernard A. Couture, Jr., Guilderland, NY (US); William E. Adis, Scotia, NY (US); Michael D. Mack, Ballston Spa, NY (US); Xiaoqing Zheng, Niskayuna, NY (US); Hemant V. Gedam, Karnataka (IN)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 12/650,896

(22) Filed: Dec. 31, 2009

(51) Int. Cl.
*F16J 15/44* (2006.01)
(52) U.S. Cl. ........................................ 277/355
(58) Field of Classification Search ................... 277/355
See application file for complete search history.

(56) References Cited

U.S. PATENT DOCUMENTS

| | | | |
|---|---|---|---|
| 5,401,036 A * | 3/1995 | Basu | 277/355 |
| 5,799,952 A | 9/1998 | Morrison et al. | |
| 6,196,550 B1 * | 3/2001 | Arora et al. | 277/355 |
| 6,308,957 B1 * | 10/2001 | Wright | 277/355 |
| 6,685,427 B1 * | 2/2004 | Dhar et al. | 415/173.3 |
| 7,255,352 B2 | 8/2007 | Adis et al. | |
| 7,604,242 B2 * | 10/2009 | Adis et al. | 277/355 |

* cited by examiner

Primary Examiner — Shane Bomar
Assistant Examiner — Blake Michener
(74) Attorney, Agent, or Firm — Mark E. Henderson; Ernest G. Cusick; Frank A. Landgraff

(57) ABSTRACT

A circumferentially extending brush seal positioned between static and rotary components of a machine and, during operation of the machine, the brush seal having a higher pressure region at an upstream side and a lower pressure region at a downstream side. The brush seal may include a plurality of bristles forming a bristle pack carried by the static component and cantilevered toward the rotary component such that tips of at least some of the bristles engage the rotary component. The brush seal further may include a pressure plate and a bristle pack backing plate. The bristle backing plate may include a plurality of radially extending and circumferentially spaced slots opening through opposite sides thereof. The slots may be disposed on an inner radial edge and an outer radial edge of the bristle backing plate.

22 Claims, 6 Drawing Sheets

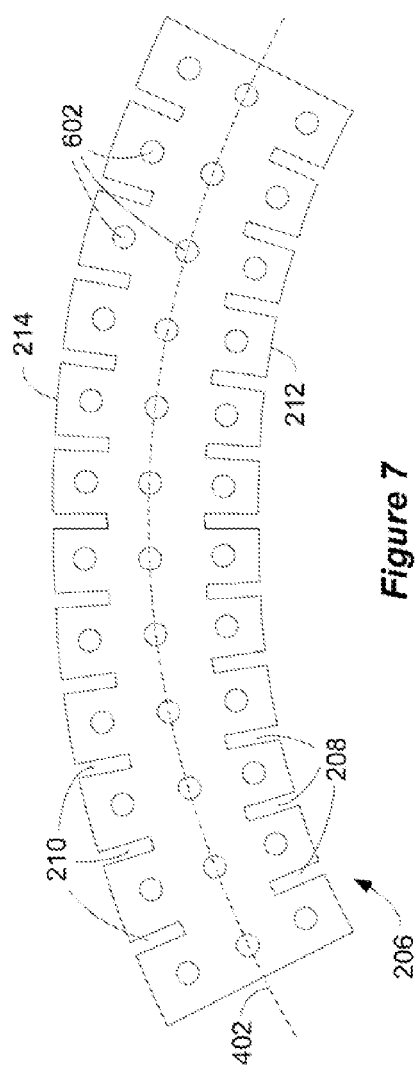
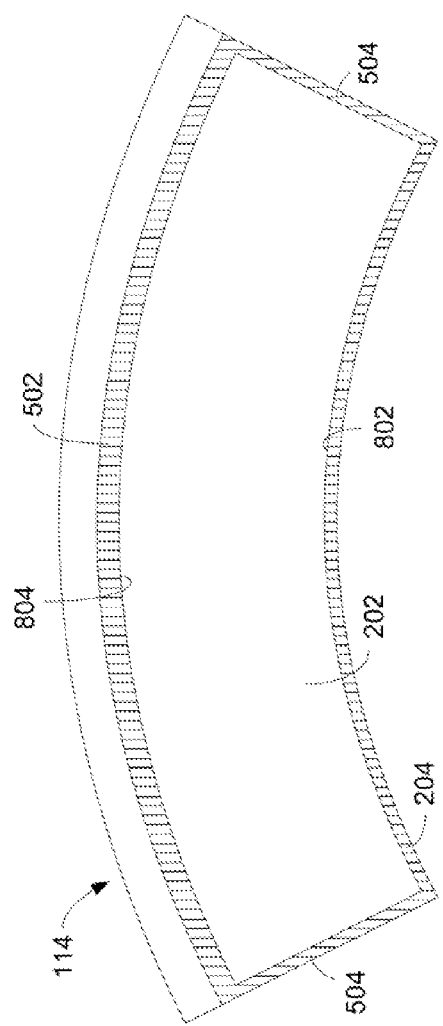
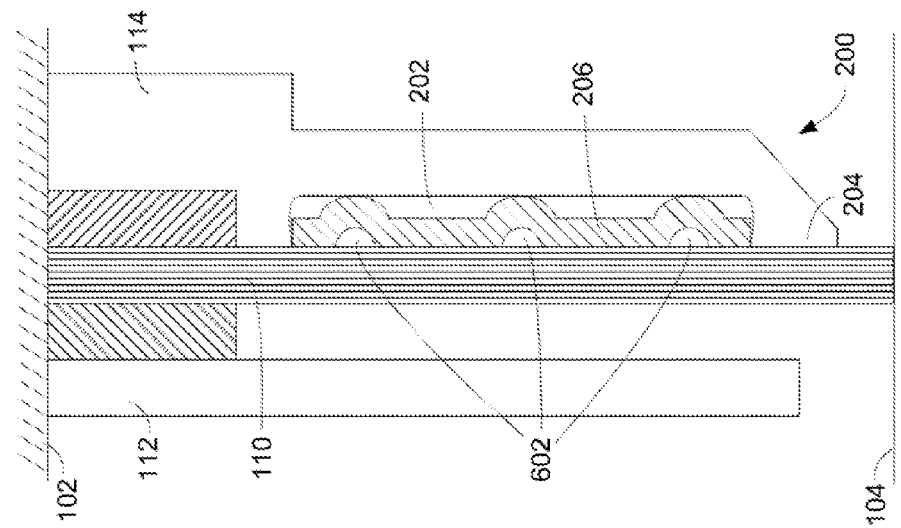

BRUSH SEALS

BACKGROUND OF THE INVENTION

The present application relates generally to systems and/or apparatus for improving the efficiency and/or operation of turbine engines and/or industrial machinery, which, as used herein and unless specifically stated otherwise, is meant to include all types of engines and, particularly, turbine or rotary engines, including gas turbine engines, aircraft engines, power generation engines, steam turbine engines and others. More specifically, but not by way of limitation, the present application relates to methods, systems, and/or apparatus pertaining to an improved brush seal between the stationary and rotating parts of a turbomachine such as a steam turbine.

During operation of a turbomachine, a high pressure region is created at an upstream side and a low pressure region is created at a downstream side of stationary and rotating parts of the turbomachine. For free rotation of the rotating parts, clearance gaps are left between the stationary and rotating parts. However, if these gaps are not properly sealed, flow leakage may occur from the high pressure region to the low pressure region. This leakage through the stationary and rotating parts of the turbomachine may have a significant effect on the performance of the turbomachine.

Over the years, different concepts have been used for sealing the clearance gap between the stationary and rotating parts. These include non-contact type labyrinth seals and contact type brush seals, both of which are widely used in turbomachines to provide dynamic seals between the rotating and static components. The labyrinth seal either requires a large physical clearance to avoid contact, or has initial rubs, which may result in blunted-teeth and subsequently cause substantial leakage. On the other hand, the effective clearance in the brush seal is substantially less than in the conventional labyrinth seal, as the brush seal maintains contact with the rotor during a majority of the rotor's operating cycle. However, pressure drop across the bristles in the brush seal may result in a stiff bristle pack, which may lead to heating of the rotor, and may subsequently cause high vibration. Moreover, the bristles tend to deform under the influence of the pressure drop. To counter this effect, generally a pressure plate may be used to provide lateral support for the bristles on the downstream side, i.e., the low pressure side of the bristles. However, the pressure drop that exists across the bristle pack may cause the bristles to have a frictional engagement with the face of the pressure plate, and thus increases bristle stiffness and causes wear in case of rotor excursion. Moreover, the restoring forces provided by the inherent resilience of the bristles and other such forces are also inhibited, which further affects sealing performance of the brush seal.

The frictional engagement may be reduced by achieving a configuration that results in balanced pressure on either sides of the bristle pack. Several prior attempts have been made to introduce pressure balancing features in the brush seals. One such solution involves positioning the pressure plate interposed between the bristle layer and the low pressure region such that the arrangement defines at least one pocket formed between the bristle pack and the pressure plate. The benefit can be maximized by making the pocket wide enough to cover most of the radial length of the pressure plate. However, such a pocket will compromise the support provided by the pressure plate. One solution is to divide the pocket into multiple grooves such that improved support for the bristles is provided. However, the lands provided between the grooves generally prevent pressure communication between the grooves. Holes may be used to provide communication tunnels between the grooves, or even connection to upstream pressure directly. However, such designs generally results in a overly thick pressure plate, made so to accommodate the necessary holes and passageways. In addition, such features generally create manufacturing difficulties or, at minimum, increased costs. More often, the pressure balancing features, i.e., the multiple cavities or grooves, end up negatively affecting the support the pressure plate provides to the bristle pad. And, narrow land portions cause damage to the bristles, cutting or permanently bending them. These limitations, in turn, limit the use of the brush seal at higher-pressure differentials and/or higher temperatures.

As a result, there is a need for improved brush seals that are cost-effective while also being effective at preventing leakage between the stationary and rotating parts of the turbomachines and other industrial machinery.

BRIEF DESCRIPTION OF THE INVENTION

The present application thus describes a circumferentially extending brush seal positioned between static and rotary components of a machine and, during operation of the machine, having a higher pressure region at an upstream side and a lower pressure region at a downstream side, the brush seal including: a plurality of bristles forming a bristle pack carried by, the static component and cantilevered toward the rotary component; a pressure plate carried by the static component on a downstream side of the bristle pack; and a bristle pack backing plate carried by the static component between the bristle pack and the pressure plate. The bristle backing plate may include a plurality of radially extending and circumferentially spaced slots opening through opposite sides thereof. The slots may be disposed on an inner radial edge and an outer radial edge of the bristle backing plate.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIGS. 6, 7 and 8 illustrate cross-sectional and front views of the brush seal, according to another exemplary embodiment of the present application.

DETAILED DESCRIPTION OF THE INVENTION

To describe clearly the invention of the current application, it may be necessary to select terminology that refers to and describes certain machine components or parts of a turbine engine. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often certain components may be referred to with several different names. In addition, what may be described herein as a single part may include and be referenced in another context as consisting of several component parts, or, what may be described herein as including multiple component parts may be fashioned into and, in some cases, referred to as a single part. As such, in understanding the scope of the invention described herein, attention should not only be paid to the terminology and description provided, but also to the structure, configuration, function, and/or usage of the component as described herein.

In addition, several descriptive terms may be used herein. The meaning for these terms shall include the following definitions. As used herein, "downstream" and "upstream" are terms that indicate a direction relative to the flow of working fluid through the turbine. As such, the term "downstream" means the direction of the flow, and the term "upstream" means in the opposite direction of the flow through the turbine. The term "radial" refers to movement or position perpendicular to an axis. It is often required to describe parts that are at differing radial positions with regard to an axis. In this case, if a first component resides closer to the axis than a second component, it may be stated herein that the first component is "inboard" or "radially inward" of the second component. If, on the other hand, the first component resides further from the axis than the second component, it may be stated herein that the first component is "outboard" or "radially outward" of the second component. The term "axial" refers to movement or position parallel to an axis. And, the term "circumferential" refers to movement or position around an axis.

Figure 1:
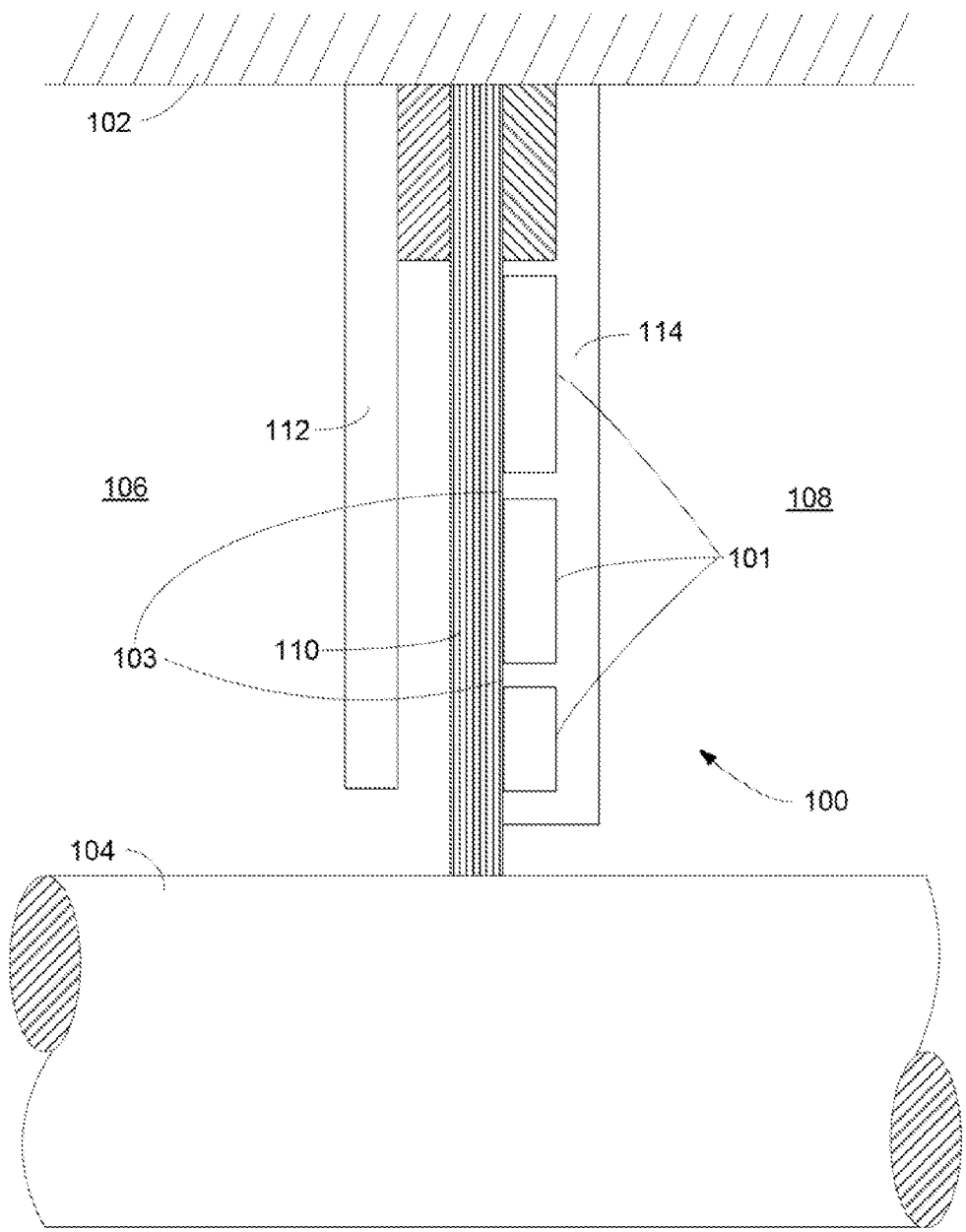
FIG. 1 illustrates a cross-sectional view of a conventional brush seal with typical pressure balance grooves.

Referring now to the figures, where the various numbers represent like parts throughout the several views, FIG. 1 illustrates a cross-sectional view of a conventional brush seal 100 with conventional pressure balancing grooves 101. The circumferentially extending brush seal 100 may be positioned between a static component 102 and a rotary component 104 of a turbomachine. During the operation of the turbomachine, the flow may start from an upstream side, forming a higher pressure region 106, towards a downstream side, forming a lower pressure region 108. The brush seal 100 may further include a bristle pack 110 formed by packing a plurality of bristles together. The bristle pack 110 may be carried by the static component 102 and cantilevered toward the rotary component 104, such that the tips of the bristles engage with the rotary component 104 during the operation of the turbomachine. The brush seal 100 further may include a circumferentially extending fence 112, positioned upstream of the bristle pack 110, such that a tip of the fence 112 terminates such that it does not engage the rotary component 104. During the operation of the machine, the bristles of the bristle pack 110 tend to deform under the influence of the pressure drop that exists across the bristle pack 110. To counter this effect, the brush seal 100 may further include a pressure plate 114, carried by the static component 102 on the downstream side of the bristle pack 110. The pressure plate 114 may project toward the rotary component 104 such that it terminates such that it does not engage the rotary component 104.

The pressure drop that exists across the bristle pack 110 presses the bristles against the pressure plate 114, thereby causing a frictional engagement with the face of the pressure plate 114, which may limit the life of the bristles. In addition, the frictional engagement may also inhibit the restoring forces provided by the inherent resilience of the bristles and other such forces, which may further affect sealing performance of the brush seal 100. The frictional engagement may be reduced by configuring the brush seal 100 such that the pressure on either sides of the bristle pack 110 is substantially balanced. Several prior attempts have been made to introduce pressure balancing features in the brush seal 100. One such solution involves positioning the pressure plate 114 interposed between the bristle pack 110 and the low pressure region 108, such that the arrangement defines at least one pocket formed between the bristle pack 110 and the pressure plate 114. The arrangement also includes means for supplying said pocket with fluid at a pressure, which is higher than that of the low pressure region 108, thereby reducing the pressure drop across the bristle pack 110. However, such designs may result in a very broad brush seal 100. It is also noted that suppliers of brush seals may be limited by the available space for the seals as well as manufacturing difficulties in the formation of the brush seals. Further, having multiple grooves 101 may help to provided support for the bristles, however, lands 103 formed between the grooves 101 may prevent pressure communication between the grooves 101. Therefore, in such scenarios, passageways or holes (not shown) may be used to provide communication tunnels between the grooves 101. However, as stated, such designs may result in an overly thick pressure plate. These limitations, in turn, limit the use of such brush seals 100 at higher-pressure differentials and/or higher temperatures.

Figure 2:
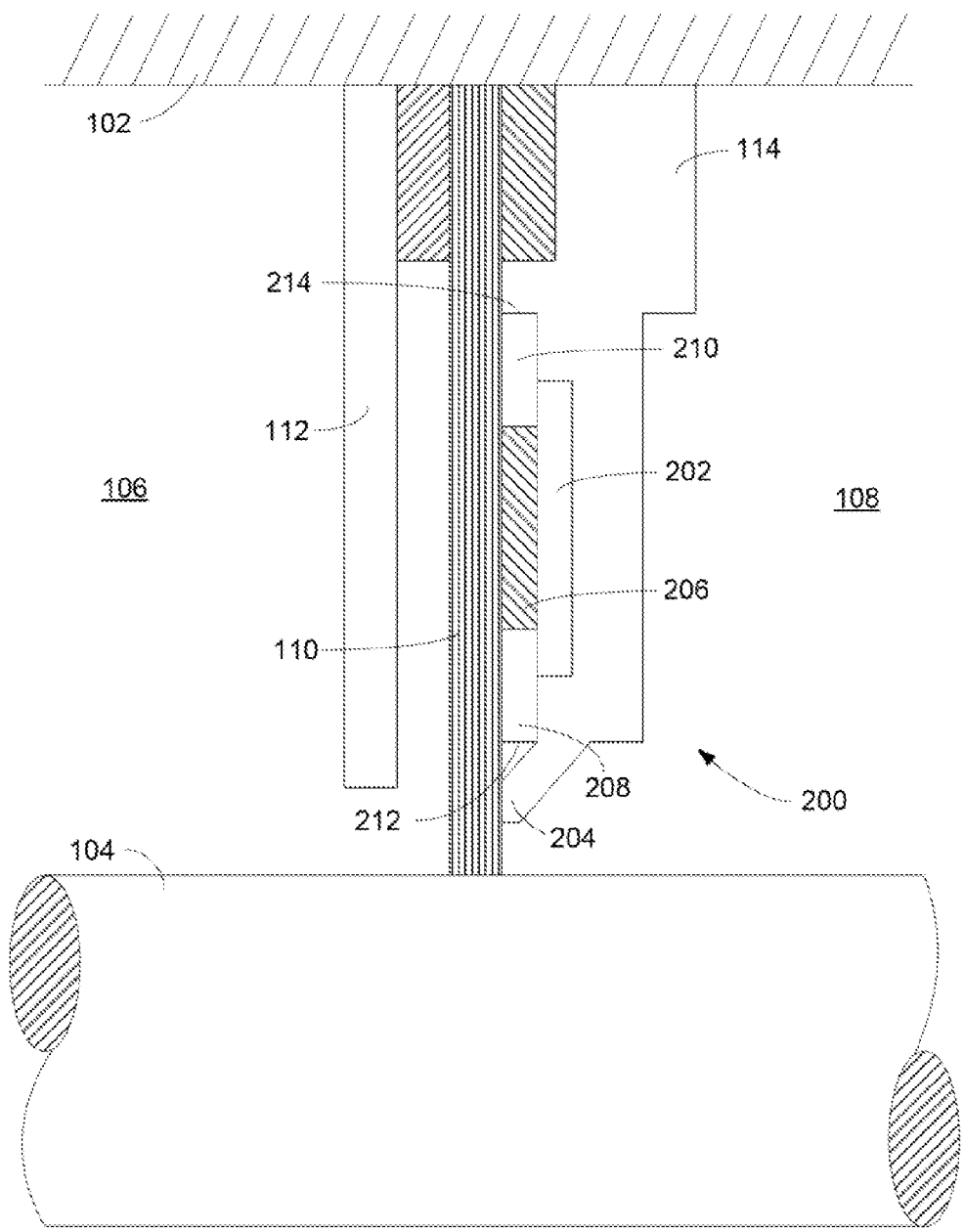
FIG. 2 illustrates a cross-sectional view of a circumferentially extending brush seal according to an embodiment of the present application.

FIGS. 2 to 14 illustrate various exemplary embodiments of the present application. FIG. 2 illustrates a cross-sectional view of a circumferentially extending brush seal 200 according to an exemplary embodiment of the present application. The brush seal 200 may be positioned between the static component 102 and the rotary component 104 of the turbomachine. Those of ordinary skill in the art will appreciate that embodiments of the present application described herein may be used in several types of turbomachines, including, but not limited to, gas turbine engines, aircraft engines, power generation engines, steam turbine engines and the like. As shown in the FIG. 2, the static component 102 of the turbomachine may be a stator and the rotary component 104 of the turbomachine may be a rotor. During operation of the turbomachine, the flow may start from an upstream side, forming the higher pressure region 106, towards a downstream side, forming the lower pressure region 108. The brush seal 200 may include the bristle pack 110 formed by packing a plurality of bristles together. In an embodiment of the present application, the bristle pack 110 may be carried by the static component 102 and cantilevered toward the rotary component 104. This arrangement may allow tips of at least some of the bristles to engage with the rotary component 104 during the operation of the turbomachine. The brush seal 200 may further include the circumferentially extending fence 112 which is positioned upstream of the bristle pack 110. In an embodiment of the present application, the fence 112 may be carried by the static component 102 and may project toward the rotary component 104, such that the tip of the fence 112 terminates such that it does not engage the rotary component 104.

The brush seal 200 may further include the pressure plate 114, which is carried by the static component 102 on the downstream side of the bristle pack 110. The pressure plate 114 may project toward the rotary component 104. The pressure plate 114 may include at least one circumferentially extending groove 202, which is formed on a side facing the bristle pack 110, such that a cavity is formed between the bristle pack 110 and the pressure plate 114. The pressure plate 114 may further include a lower dam 204, such that the lower dam 204 engages the bristle tips of the bristle pack 110, but does not engage the rotary component 104. This may prevent the axial movement of the bristle tips under the influence of high pressure on the upstream side of the bristle pack 110.

The brush seal 100 may further include a bristle pack backing plate 206 between the bristle pack 110 and the pressure plate 114. The bristle pack backing plate 206 may be carried by the groove 202 of the pressure plate 114 in various ways. In an exemplary embodiment of the present application, the inner and outer radial edges of the bristle pack backing plate 206 may be joined to the groove 202 of the pressure plate 114 by means of welding. In other exemplary embodiments of the present application, the bristle pack backing plate 206 may be snapped into the groove 202 of the pressure plate 114. The bristle pack backing plate 206 may further include a plurality of radially extending and circumferentially spaced inner radial slots 208 and outer radial slots 210 opening through opposite sides thereof. The inner radial slots 208 may be circumferentially disposed on an inner radial edge 212 of the bristle pack backing plate 206. Similarly, the outer radial slots 210 may be circumferentially disposed on an outer radial edge 214 of the bristle pack backing plate 206. Various configurations of the slots 208 and 210 may be employed in the bristle pack backing plate 206, as explained in conjunction with the FIGS. 4, 7, 10 and 13.

In an exemplary embodiment of the present application, the fence 112 described herein may be formed of 430 stainless steel, the pressure plate 114 may be formed of 430 stainless steel, and the bristle pack backing plate 206 may be formed of 409 stainless steel. The use of different materials for the pressure plate 114 and the bristle pack backing plate 206 may allow the brush seal 200 to be cost-effective, as well as allow the usage of the brush seal 100 in areas with high temperature and high pressure differential. Those of ordinary skill in the art will appreciate that the material used for manufacturing a brush seal may be a crucial factor in determining both the cost-effectiveness as well as performance of the turbomachine. Further, the examples given above are just for descriptive purposes and do not limit the scope of the present application.

The bristle pack 110, the fence 112 and the pressure plate 114 described herein may be joined to each other and to the static component 102 by means of welding. Further, the bristle pack 110, the fence 112, the pressure plate 114 and the bristle pack backing plate 206 may be provided in arcuate segments about the axis of the rotary component 104, such as, but not limited to, six segments of 60° each. FIGS. 3 to 14 illustrate the cross-sectional views and front views of such arcuate segments of the bristle pack backing plate 206 and the pressure plate 114, according to various exemplary embodiments of the present application.

Figure 3:
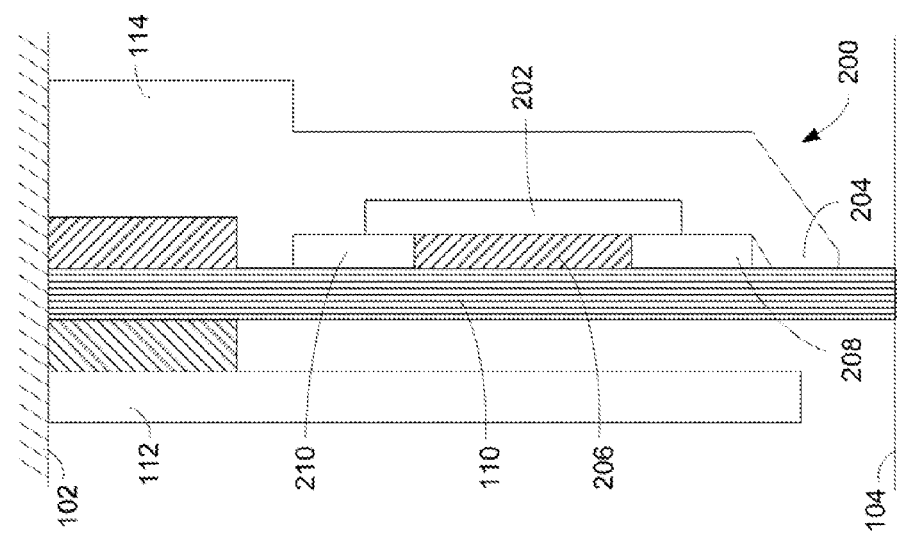

FIG. 3 illustrates the cross-sectional view of the brush seal 200 according to an exemplary embodiment of the present application. As shown in the FIG. 3, the brush seal 200 may be positioned between the static component 102 and the rotary component 104 of the turbomachine. The brush seal 200 may further include a plurality of bristles forming the bristle pack 110. The brush seal 200 may also include the pressure plate 114 on a downstream side of the bristle pack 110, and the fence 112 positioned on the upstream side of the bristle pack 110. The bristle pack 110, the pressure plate 114 and the fence 112 may be carried by the static component 102 and cantilevered toward the rotary component 104. The brush seal 200 may further include the bristle pack backing plate 206, which is carried by the static component 102 between the bristle pack 110 and the pressure plate 114.

Figure 4:
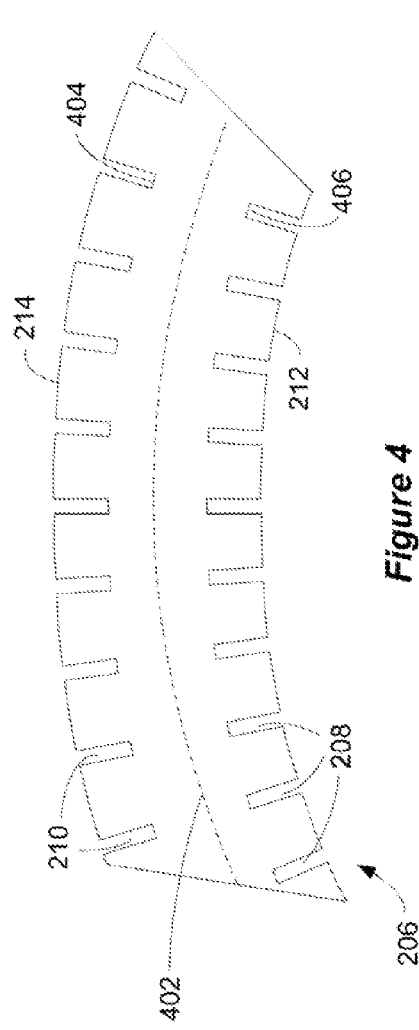
FIGS. 3, 4 and 5 illustrate cross-sectional and front views of the brush seal, according to an exemplary embodiment of the present application.
Figure 5:
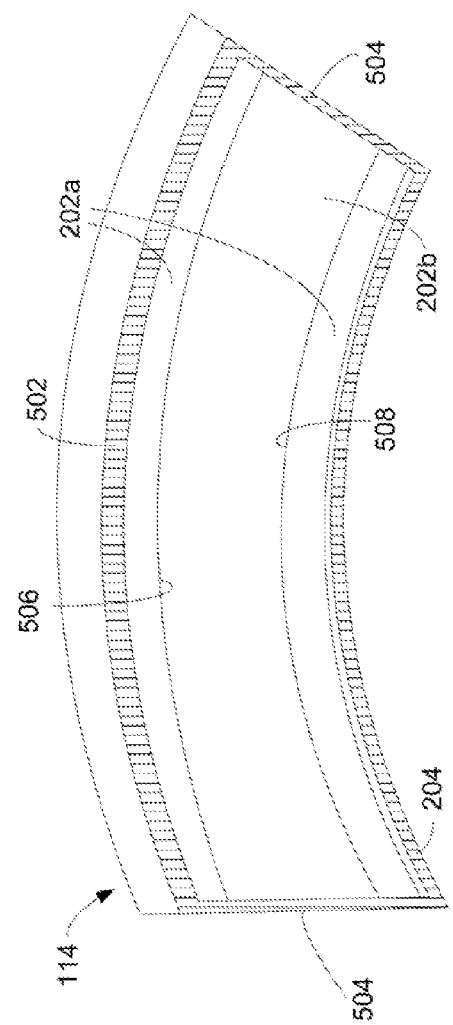

FIGS. 4 and 5 illustrate the front views of arcuate segments of the bristle pack backing plate 206 and the pressure plate 114, and will be discussed in conjunction with FIG. 3. As shown in the FIG. 4, the bristle pack backing plate 206 may include plurality of radially extending and circumferentially spaced slots 208 and 210, opening through opposite sides of the bristle pack backing plate 206. The slots 208 and 210 may be disposed on the inner radial edge 212 and the outer radial edge 214, respectively, of the bristle pack backing plate 206. The inner radial slots 208 may begin in proximity to a radial center 402 of the bristle pack backing plate 206 and extend radially through the inner radial edge 212. Similarly, the outer radial slots 210 may begin in proximity to the radial center 402 of the bristle pack backing plate 206 and extend radially through the outer radial edge 214. In an embodiment of the present application, each of the inner radial slots 208 as well as the outer radial slots 210 may be of substantially narrow rectangular shape and spaced at approximately regular intervals around the circumference of the bristle pack backing plate 206. Further, the radial slots 208 and 210 may be aligned such that each outer radial slot 210 coincides with one of the inner radial slots 208 at a selected circumferential position. The radial slots 208 and 210 may have a longitudinal axis that is aligned in the radial direction. In other embodiments, the radial slots 208 and 210 may have a longitudinal axis that forms an angle with the radial direction.

FIG. 5 illustrates the front view of one side of the pressure plate 114, which faces the bristle pack backing plate 206. The pressure plate 114 may include an upper dam 502, the lower dam 204 and two side darns 504 that may be in contact with the bristle pack 110. In an exemplary embodiment of the present invention, the two side darns may or may not be radial cut as shown in the figure. Further, the pressure plate 114 may have plurality of circumferentially extending grooves 202 formed on the side facing the bristle pack backing plate 206. In one embodiment of the present application, the pressure plate 114 may have two grooves: a first groove 202a and a second groove 202b. The first groove 202a may be configured such that the bristle pack backing plate 206 sits snugly within the first groove 202a during the operation of the turbomachine. The pressure plate 114 may have the second groove 202b, formed within the first groove 202a. This may result in a cavity between the pressure plate 114 and the bristle pack backing plate 206, when the bristle pack backing plate 206 is joined to the pressure plate 114. Further, an outer radial edge 506 of the second groove 202b may be positioned outboard of an inner radial edge 404 of the outer radial slots 210. Similarly, an inner radial edge 508 of the second groove 202b may be positioned inboard of an outer radial edge 406 of the inner radial slots 208. This configuration may allow a flow channel to be formed that connects each of the inner radial slots 208 to at least one corresponding outer radial slot 210. This may further allow each of the inner radial slots 208 to have a fluid communication with at least one corresponding outer radial slot 210, through the cavity formed by the second groove 202b. Further, at a first selected radius, the second groove 202b may overlie a plurality of inner radial slots 208, while at a second selected radius, the second groove 202b may overlie a plurality of outer radial slots 210. Correspondingly, at least plurality of the inner radial slots 208 and plurality of the outer radial slots 210 may be in fluid communication via the second groove 202b. The configuration described herein may result in a substantially uniform pressure distribution to be maintained along the downstream side of the bristle pack 110. During the operation of the turbomachine, a portion of fluid from the high pressure region 106 may pass through the bristle pack 110, and may enter the second groove 202b of the pressure plate 114 via the outer radial slots 210 and come out through the inner radial slots 208 of the bristle pack backing plate 206 to pressurize the inner region of the seal. Inside the second groove 202b, the fluid may maintain a pressure, which is higher than that of the low pressure region 108, and thus may reduce the pressure drop across the bristle pack 110, until approximately equal pressure is achieved on either sides of the bristle pack 110. The balanced pressure on either sides of the bristle pack 110 reduces the frictional engagement between the bristle pack 110 and the bristle pack backing plate 206, and allows substantial free movement of the bristles of the bristle pack 110.

In one embodiment of the present application, the inner radial slots 208 and the outer radial slots 210 may be configured such that a first ratio of the radial length of each of the inner radial slots 208 divided by the radial length of the bristle pack backing plate 206 may be of a value between approximately, but not limited to, 0.17 and 0.33, and a second ratio of the radial length of the each of the outer radial slots 210 divided by the radial length of the bristle pack backing plate 206 may be of a value between approximately, but not limited to, 0.17 and 0.33. Further, a third ratio of the circumferential width of each of the inner radial slots 208 divided by it radial length of the slots 208 may be of a value between approximately, but not limited to, 0.20 and 2.0, and a fourth ratio of the circumferential width of each of the outer radial slots 210 divided by it radial length of the slots 210 may be of a value between approximately, but not limited to, 0.2 and 3.0. In other exemplary embodiments of the present application, the first ratio may be of a value between approximately, but not limited to, 0.20 and 0.30, the second ratio may be of a value between approximately, but not limited to, 0.17 and ¼0.25, the third ratio may be of a value between approximately 0.5 and 1.0, and the fourth ratio may be of a value between approximately, but not limited to, 0.5 and 1.0.

FIG. 6 illustrates the cross-sectional view of the brush seal 200 according to another exemplary embodiment of the present application. Similar to other exemplary embodiments (as explained in FIGS. 2 and 3) of the present application, the brush seal 200 may be positioned between the static component 102 and the rotary component 104 of the turbomachine. The brush seal 200 may further include a plurality of bristles forming the bristle pack 110. The brush seal 200 may further include the pressure plate 114 positioned downstream of the bristle pack 110, and the fence 112, which is positioned upstream of the bristle pack 110. The bristle pack 110, the pressure plate 114 and the fence 112 may be carried by the static component 102 and cantilevered toward the rotary component 104. The brush seal 200 may further include the bristle pack backing plate 206 carried by the static component 102 between the bristle pack 110 and the pressure plate 114.

FIGS. 7 and 8 illustrate the front views of arcuate segments of the bristle pack backing plate 206 and the pressure plate 114 respectively. As shown in the FIG. 7, the bristle pack backing plate 206 may include the plurality of radially extending and circumferentially spaced inner radial slots 208 and outer radial slots 210, opening through opposite sides of the bristle pack backing plate 206. The slots 208 and 210 may be disposed on the inner radial edge 212 and the outer radial edge 214, respectively, of the bristle pack backing plate 206. The inner radial slots 208 may begin in proximity to the radial center 402 of the bristle pack backing plate 206 and extend radially through the inner radial edge 212 of the bristle pack backing plate 206. Similarly, the outer radial slots 210 may begin in proximity to the radial center 402 of the bristle pack backing plate 206 and may extend radially through the outer radial edge 214 of the bristle pack backing plate 206. In an embodiment of the present application, each of the inner radial slots 208 as well as the outer radial slots 210 may be of approximately narrow rectangular shape and spaced at approximately the same regular intervals around the circumference of the bristle pack backing plate 206. Further, the radial slots 208 and 210 may be aligned such that each outer radial slot 210 coincides with one of the inner radial slots 208 at a selected circumferential position.

The bristle pack backing plate 206 may further include a plurality of discrete raised areas 602. As illustrated in the FIG. 6, the raised areas 602 may be configured such that when the bristle pack backing plate 206 is suitably installed against the pressure plate 114 in the brush seal 200, the raised areas 602 make contact with the pressure plate 114. This may form a cavity between the bristle pack backing plate 206 and the pressure plate 114. In an embodiment of the present application, as shown in the FIG. 6, the raised areas 602 may be a plurality of dimples spaced regularly or irregularly around the circumference of the bristle pack backing plate 206. Those of ordinary skill in the art will appreciate that the dimples or raised areas 602 may be created by, but not limited to, metal sheet stamping. In an embodiment of the present application, the dimples or the raised areas 602 may or may not be stamped through. According to another embodiment, the raised areas 602 may be a plurality of ridges (not illustrated in the figure) extending either circumferentially or radially along the bristle pack backing plate 206.

FIG. 8 illustrates the front view of one side of the pressure plate 114, which faces the bristle pack backing plate 206. The pressure plate 114 may include the upper dam 502, the lower dam 204 and two side dams 504 that are in contact with the bristle pack 110. Further, the pressure plate 114 may have a circumferentially extending groove 202 formed on a side that faces the bristle pack backing plate 206. An inner radial edge 802 and an outer radial edge 804 of the groove 202 may include an inwardly slanting face, which is configured such that the opposing inwardly slanting faces hold the bristle pack backing plate 206 within the groove 202. Further, the bristle pack backing plate 206 may sit snugly within the groove 202, during the operation of the turbomachine. As already described, the raised areas 602 of the bristle pack backing plate 206 may make contact with the pressure plate 114. This configuration may allow the raised areas 602 to raise the bristle pack backing plate 206 up from the bottom of the groove 202 of the pressure plate 114 to support the bristle pack 110. Correspondingly, the depth of the groove 202 may be approximately equal to, but not limited to, the thickness of the bristle pack backing plate 206 plus the height of the raised area 602. During the operation of the turbomachine, fluid may enter the cavity formed between the bristle pack backing plate 206 and the pressure plate 114 through the outer radial slots 210 and come out through inner radial slots 208 of the bristle pack backing plate 206 to pressurize the inner region of the seal. The cavity formed between the bristle pack backing plate 206 and the pressure plate 114 may allow the pressure in this region to remain equalized across the radial direction. In some embodiments of the present application, this configuration may provide effective bristle support. The use of a single groove 202 in the configuration may also allow the thickness of the pressure plate 114 to be kept low, and this may allow the cost of manufacturing the brush-seal 200 to be reduced.

Figure 9:
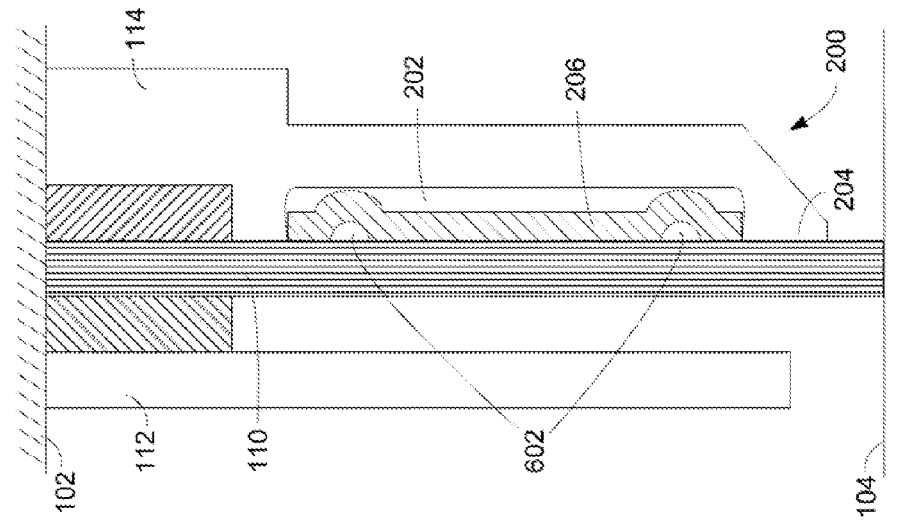

FIG. 9 illustrates the cross-sectional view of the brush seal 200 according to another exemplary embodiment of the present application. As shown in the FIG. 9, the brush seal 200 may be positioned between the static component 102 and the rotary component 104 of the turbomachine. The brush seal 200 may include the bristle pack 110, the pressure plate 114, the fence 112, and the bristle pack backing plate 206 between the bristle pack 110 and the pressure plate 114. The bristle pack 110, the pressure plate 114 and the fence 112 may be carried by the static component 102 and cantilevered toward the rotary component 104.

Figure 10:
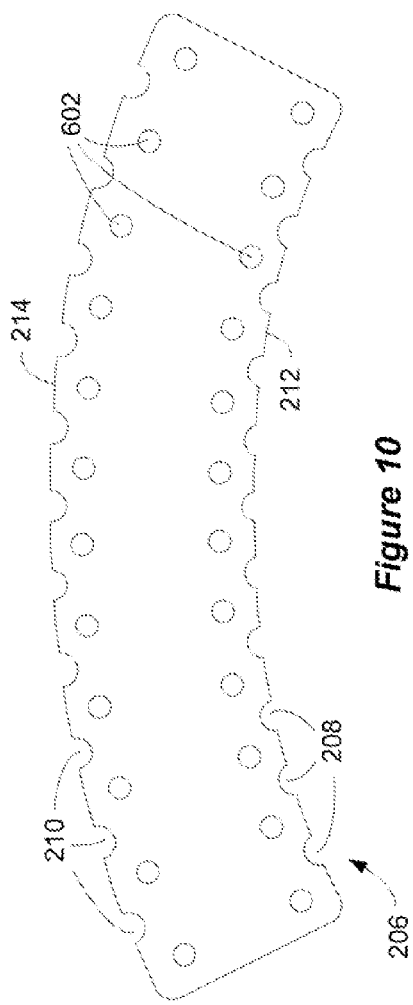
FIGS. 9, 10 and 11 illustrate cross-sectional and front views of the brush seal, according to another exemplary embodiment of the present application.
Figure 11:
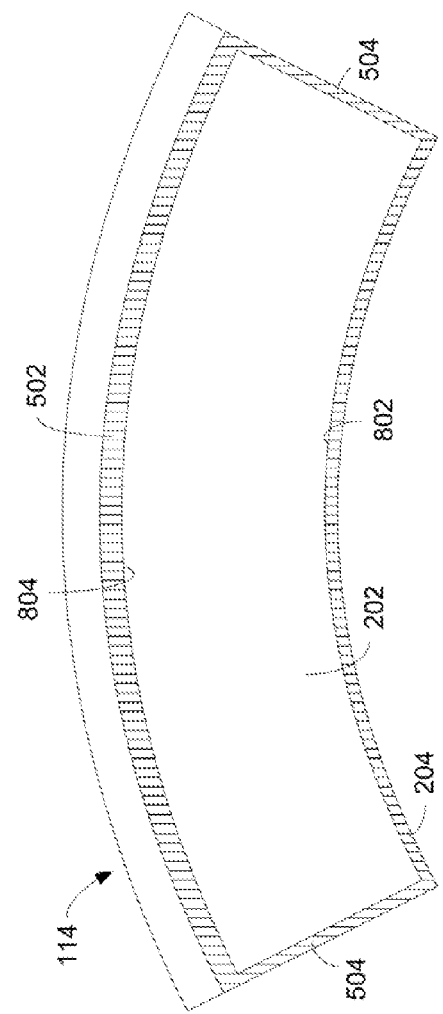

FIGS. 10 and 11 illustrate the front views of arcuate segments of the bristle pack backing plate 206 and the pressure plate 114 respectively. As shown in the FIG. 10, the bristle pack backing plate 206 may include a plurality of radially extending and circumferentially spaced inner radial slots 208 and outer radial slots 210, opening through opposite sides of the bristle pack backing plate 206. The slots 208 and 210 may be disposed on the inner radial edge 212 and the outer radial edge 214, respectively, of the bristle pack backing plate 206. In an embodiment of the present application, the inner radial slots 208 and outer radial slots 210 may be of a radially shallow circumferentially narrow shape, such as, but not limited to, a scallop shape. The use of scallop shaped slots may allow certain performance advantages, such as, reducing the possibility that the bristles of the bristle pack 110 may get entangled in the slots 208 and 210, during the operation of the turbomachine. Those of ordinary skill in the art will appreciate that the scallop shaped slots 208 and 210 may be cut out through, but not limited to, metal sheet stamping. The bristle pack backing plate 206 may further include a plurality of discrete raised areas 602. As illustrated in the FIG. 9, the raised areas 602 may be configured such that when the bristle pack backing plate 206 is suitably installed against the pressure plate 114 in the brush seal 200, the raised areas 602 make contact with the pressure plate 114. This may forms a cavity between the bristle pack backing plate 206 and the pressure plate 114.

FIG. 11 illustrates the front view of the side of the pressure plate 114 facing the bristle pack backing plate 206. The pressure plate 114 may include the upper dam 502, the lower dam 204 and two side dams 504 that are in contact with the bristle pack 110. Further, the pressure plate 114 may have at least one circumferentially extending groove 202, formed on a side that faces the bristle pack backing plate 206. The groove 202 may include inwardly slanting inner radial edge 802 and outer radial edge 804 that hold the bristle pack backing plate 206 within the groove 202. During the operation of the turbomachine, fluid may enter the cavity formed between the bristle pack backing plate 206 and the pressure plate 114 through the scallop shaped outer radial slots 210 and come out through inner radial slots 210 to pressurize the tip region of the pressure plate 114. The cavity formed between the bristle pack backing plate 206 and the pressure plate 114 may allow the pressure in this region to remain equalized across the radial direction.

Figure 12:
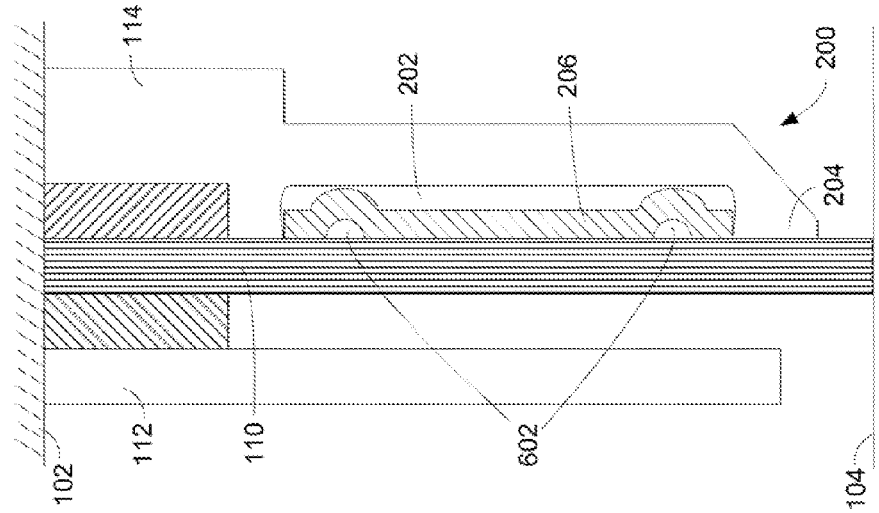

FIG. 12 illustrates the cross-sectional view of the brush seal 200 according to another exemplary embodiment of the present application. As shown in the FIG. 12, the brush seal 200 may be positioned between the static component 102 and the rotary component 104 of the turbomachine. The brush seal 200 may include the bristle pack 110, the pressure plate 114, the fence 112, and the bristle pack backing plate 206 between the bristle pack 110 and the pressure plate 114. The bristle pack 110, the pressure plate 114 and the fence 112 may be carried by the static component 102 and cantilevered toward the rotary component 104.

Figure 13:
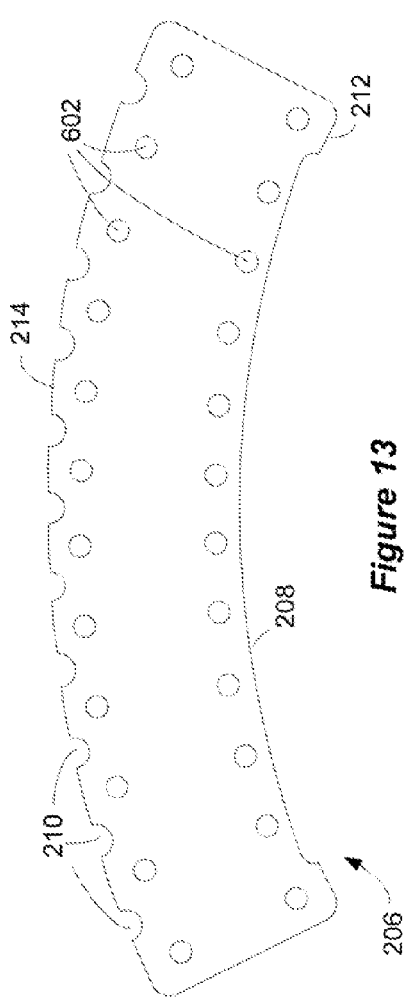
FIGS. 12, 13 and 14 illustrate cross-sectional and front views of the brush seal, according to another exemplary embodiment of the present application.
Figure 14:
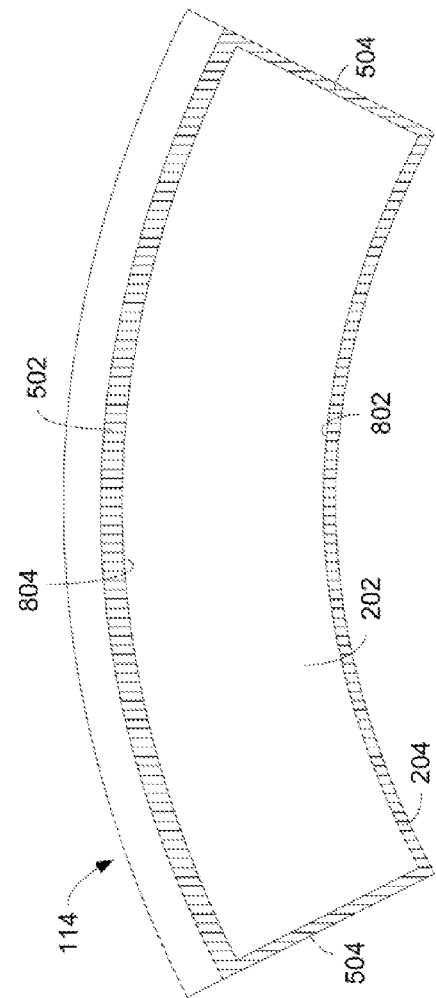

FIGS. 13 and 14 illustrate the front views of arcuate segments of the bristle pack backing plate 206 and the pressure plate 114 respectively. As shown in the FIG. 13, the bristle pack backing plate 206 may include a plurality of radially extending and circumferentially spaced inner radial slots 208 and outer radial slot 210 opening through opposite sides of the bristle pack backing plate 206. The slots 208 and 210 may be disposed on the inner radial edge 212 and the outer radial edge 214, respectively, of the bristle pack backing plate 206. The slots 208 and 210 of the bristle pack backing plate 206 may include radially shallow and circumferentially narrow slots 210, as well as radially shallow and circumferentially wide slots 208. In one embodiment of the present application, the bristle pack backing plate 206 may include, but not by way of limitation, one radially shallow and circumferentially wide slot 208, as shown in the FIG. 13. The radially shallow and circumferentially narrow slots 210 may be circumferentially spaced along the outer radial edge 214, and the radially shallow and circumferentially wide slots 208 may be circumferentially spaced along the inner radial edge 212 of the bristle backing plate 206. The extruded part at both ends of the inner radial edge 212 may allow the bristle pack backing plate 206 to be clicked into the pressure plate 114. The smooth circumferentially wide slots 208 may allow the bristles of the bristle pack 110 to slide over easily. The bristle pack backing plate 206 may further include a plurality of discrete raised areas 602. As illustrated in the FIG. 12, when the bristle pack backing plate 206 may be suitably installed against the pressure plate 114 in the brush seal 200, the raised areas 602 make contact with the pressure plate 114, and thus a cavity is formed between the bristle pack backing plate 206 and the pressure plate 114.

FIG. 14 illustrates the front view of the side of the pressure plate 114 facing the bristle pack backing plate 206. The pressure plate 114 may include the upper dam 502, the lower dam 204 and two side dams 504 in contact with the bristle pack 110, as well as a circumferentially extending groove 202 with inwardly slanting inner radial edge 802 and outer radial edge 804 to hold the bristle pack backing plate 206 within the groove 202. During the operation of the turbomachine, fluid may enter the cavity formed between the bristle pack backing plate 206 and the pressure plate 114 through the radially shallow and circumferentially narrow slots 210 and radially shallow and circumferentially wide slots 208. The cavity formed between the bristle pack backing plate 206 and the pressure plate 114 may allow the pressure in this region to remain equalized across the radial direction.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A circumferentially extending brush seal positioned between static and rotary components of a machine and, during operation of the machine, having a higher pressure region at an upstream side and a lower pressure region at a downstream side, the brush seal comprising:
   a plurality of bristles forming a bristle pack carried by the static component and cantilevered toward the rotary component;
   a pressure plate carried by the static component on a downstream side of the bristle pack; and
   a bristle pack backing plate carried by the static component between the bristle pack and the pressure plate;
   wherein:
      the bristle backing plate includes a plurality of radially extending and circumferentially spaced slots opening through opposite sides thereof and extending partially through the bristle backing plate; and
      the slots are disposed on an inner radial edge and an outer radial edge of the bristle backing plate.

2. The brush seal according to claim 1, wherein:
   the bristle pack is cantilevered toward the rotary component such that tips of at least some of the bristles engage the rotary component;
   the machine is one of a combustion turbine engine and a steam turbine engine; and
   the rotary component comprises a rotor;
   the bristle backing plate is welded to the pressure plate;
   further comprising a fence, the fence being carried by the static component and positioned upstream of the bristle pack, and extending circumferentially and projecting toward the rotary component.

3. The brush seal according to claim 1, wherein the slots of the bristle backing plate include a plurality of inner radial slots and a plurality of outer radial slots, the inner radial slots comprising slots that begins in proximity to the radial center of the bristle backing plate and extends approximately radially through the inner radial edge of the bristle backing plate and the outer radial slots comprising slots that begins in proximity to the radial center of the bristle backing plate and extends approximately radially through the outer radial edge of the bristle backing plate.

4. The brush seal according to claim 3, wherein:
   the pressure plate has a plurality of circumferential extending grooves formed on a side thereof facing the bristle backing plate, including at least:
   a first groove configured such that the bristle backing plate sits snugly therewithin during operation; and
   a second groove formed within the first groove, the second groove configured such that a flow channel is formed that connects each of the plurality of the inner radial slots to at least one of the corresponding outer radial slots.

5. The brush seal according to claim 4, wherein the second groove being configured such that the flow channel formed connects the plurality of the inner radial slots to at least one of the corresponding outer radial slots comprises configuring the second groove such that the plurality of inner radial slots are each in fluid communication with at least one of the corresponding outer radial slots.

6. The brush seal according to claim 3, wherein:
   the pressure plate has a plurality of circumferential extending grooves formed on a side thereof facing the bristle backing plate, including at least:
   a first groove configured such that the bristle backing plate sits snugly there within during operation; and
   a second groove formed within the first groove, the second groove configured to connect each of the plurality of the inner radial slots to at least one of the corresponding outer radial slots such that a substantially uniform pressure distribution along a downstream side of the bristle pack is maintained during the operation of the machine.

7. The brush seal according to claim 6, wherein:
   an outer radial edge of the second groove is positioned outboard of the inner radial edge of a plurality of the outer radial slots; and
   an inner radial edge of the second groove is positioned inboard of the outer radial edge of a plurality of the inner radial slots.

8. The brush seal according to claim 3, wherein the pressure plate has a plurality of circumferential extending grooves formed on a side thereof facing the bristle backing plate, including at least: a first groove configured such that the bristle backing plate sits snugly therewithin during operation; and a second groove formed within the first groove, the second groove configured such that at a first selected radius, the second groove overlies a plurality of the inner radial slots; and wherein the second groove is configured such that at a second selected radius, the second groove overlies a plurality of the outer radial slots.

9. The brush seal according to claim 8, wherein the second groove is configured such that at least a plurality of the inner radial slots and a plurality of the outer radial slots are in fluid communication via the second groove.

10. The brush seal according to claim 3, wherein:
    the inner radial slots each comprise a substantially narrow rectangular shape and are spaced at substantially regular intervals around the circumference of the bristle backing plate; and
    the outer radial slots each comprise a substantially narrow rectangular shape and are spaced at substantially regular intervals around the circumference of the bristle backing plate.

11. The brush seal according to claim 10, wherein the outer radial slots and the inner radial slots are spaced at substantially the same regular interval around the circumference of the bristle backing plate and aligned such that each outer radial slot coincides with one of the inner radial slots at a selected circumferential position.

12. The brush seal according to claim 10, wherein the outer radial slots and the inner radial slots are configured such that:
    a first ratio representing the radial length of each of the inner radial slots divided by the radial length of the bristle backing plate comprises a value of between approximately 0.17 and 0.33;
    a second ratio of the radial length of the each of the outer radial slots divided by the radial length of the bristle backing plate comprises a value of between approximately 0.17 and 0.33;
    a third ratio representing the circumferential width of each of the inner radial slots divided by its radial length comprises a value of between approximately 0.2 and 2.0; and
    a fourth ratio representing the circumferential width of each of the outer radial slots divided by its radial length comprises a value of between approximately 0.2 and 3.0.

13. The brush seal according to claim 12, wherein:
    the first ratio comprises a value of between approximately 0.2 and 0.3;
    the second ratio comprises a value of between approximately 0.17 and 0.25;

the third ratio comprises a value of between approximately 0.5 and 1.0; and the fourth ratio comprises a value of between approximately 0.5 and 1.5.

14. The brush seal according to claim 3, wherein the bristle backing plate further comprises a plurality of discrete raised areas, the raised areas being configured such that when the bristle backing plate is suitably installed against the pressure plate in the brush seal, the raised areas make contact with the pressure plate and thereby forms a cavity between the bristle backing plate and the pressure plate.

15. The brush seal according to claim 14, wherein the raised areas comprise one of a plurality of dimples and a plurality of ridges that are spaced around the circumference of the bristle backing plate.

16. The brush seal according to claim 14, wherein:

the pressure plate comprises a circumferential extending groove formed on a side thereof facing the bristle backing plate;

the groove is configured such that the bristle backing plate sits snugly there within during operation;

the depth of the groove corresponds approximately to the thickness of the bristle backing plate plus the height of the raised area; and an inner radial edge of the groove and an outer radial edge of the groove comprise a inwardly slanting face configured such that, during operation, the opposing inwardly slanting faces hold the bristle backing plate within the groove.

17. The brush seal according to claim 14, wherein the slots of the bristle backing plate comprise radially shallow slots that are circumferentially spaced along the inner radial edge and the outer radial edge of the bristle backing plate.

18. The brush seal according to claim 14, wherein the slots of the bristle backing plate comprise radially shallow and circumferentially narrow slots and radially shallow and circumferential wide slots.

19. The brush seal according to claim 18, wherein:

the radially shallow and circumferentially narrow slots are circumferentially spaced along the outer radial edge bristle backing plate; and the radially shallow and circumferential wide slots are circumferentially spaced along the inner radial edge bristle backing plate.

20. The brush seal according to claim 1, wherein the slots of the bristle backing plate comprise radially shallow and circumferentially narrow slots.

21. The brush seal according to claim 20, wherein the slots of the bristle backing plate comprise a scallop shape.

22. The brush seal according to claim 1, wherein the slots of the bristle backing plate comprise radially shallow and circumferential wide slots.

* * * * *